United States Patent [19]

Brauer et al.

[11] 4,231,986

[45] Nov. 4, 1980

[54] GREASE COMPATIBLE MINERAL OIL EXTENDED POLYURETHANE

[75] Inventors: Melvin Brauer, East Brunswick; Thaddeus F. Kroplinski, Old Bridge, both of N.J.

[73] Assignee: NL Industries, Inc., New York, N.Y.

[21] Appl. No.: 27,819

[22] Filed: Apr. 6, 1979

Related U.S. Application Data

[62] Division of Ser. No. 877,905, Feb. 15, 1978, Pat. No. 4,168,258.

[51] Int. Cl.$^3$ .............................................. B29H 9/00
[52] U.S. Cl. ............................. 264/272; 260/33.6 UB
[58] Field of Search ............... 264/272; 260/33.6 UB, 260/33.6 AQ, 31.8 R, 32.8 N

[56] References Cited

U.S. PATENT DOCUMENTS

| | | | |
|---|---|---|---|
| 2,753,319 | 7/1956 | Brockway | 260/30.6 |
| 2,877,212 | 3/1959 | Seligman | 260/77.5 |
| 3,055,952 | 9/1962 | Goldberg | 260/635 |
| 3,102,875 | 9/1963 | Heiss | 260/77.5 |
| 3,143,517 | 8/1964 | Heiss | 260/18 |
| 3,248,472 | 4/1966 | Montesano | 174/33 |
| 3,314,903 | 4/1967 | Belak et al. | 260/2.5 |
| 3,338,861 | 8/1967 | Mastin et al. | 260/33.6 |
| 3,355,209 | 11/1967 | Winkler | 44/7 |
| 3,378,511 | 4/1968 | Newton | 260/31.8 |
| 3,390,119 | 6/1968 | Alexander et al. | 260/33.6 |
| 3,393,173 | 7/1968 | Berry | 260/30.6 |
| 3,405,087 | 10/1968 | Fryd | 260/33.6 |
| 3,427,366 | 2/1969 | Verdol et al. | 260/859 |
| 3,432,451 | 3/1969 | Kales | 260/23 |
| 3,433,753 | 3/1969 | Farkas et al. | 260/22 |
| 3,440,224 | 4/1969 | Impola | 260/77.5 |
| 3,460,922 | 8/1969 | Hazleton | 44/7 |
| 3,483,053 | 12/1969 | Miserentino et al. | 156/97 |
| 3,634,306 | 1/1972 | Schroeder et al. | 260/33.6 UB |
| 3,652,471 | 3/1972 | Sattler | 260/22 |
| 3,668,298 | 6/1972 | Hawkins | 174/23 |
| 3,703,394 | 11/1972 | Hemming et al. | 117/5.1 |
| 3,714,110 | 1/1973 | Verdol et al. | 260/33.6 |
| 3,733,426 | 5/1973 | Kaufman et al. | 174/23 |
| 3,747,037 | 7/1973 | Earing | 336/96 |
| 3,755,241 | 8/1973 | Brady | 260/33.6 |
| 3,843,568 | 10/1974 | Woodland et al. | 260/2.5 |
| 3,846,355 | 11/1974 | Mayer | 260/18 |
| 3,869,421 | 3/1975 | Sapp et al. | 260/33.6 |
| 3,879,575 | 4/1975 | Dubbin et al. | 174/92 |
| 3,886,111 | 5/1975 | Yoshimura et al. | 260/31.2 |
| 3,933,705 | 1/1976 | Olstowski | 260/18 |
| 3,939,882 | 2/1976 | Gillemot | 141/231 |
| 3,996,413 | 12/1976 | Foord et al. | 174/23 |
| 4,008,197 | 2/1977 | Brauer et al. | 260/31.6 |
| 4,168,258 | 9/1979 | Brauer et al. | 260/33.6 |

FOREIGN PATENT DOCUMENTS 1806783 5/1970 Fed. Rep. of Germany ............ 174/23
121553 3/1971 Norway .................................... 174/23

*Primary Examiner*—Lewis T. Jacobs
*Attorney, Agent, or Firm*—Gary M. Nath

[57] ABSTRACT

A cured, cross-linked, mineral oil extended polyurethane which is non-spewing. The mineral oil extended polyurethane is further characterized by being grease compatible in that the tendency of the mineral oil to migrate is substantially reduced or eliminated. The mineral oil extended polyurethane is comprised of a defined polyurethane, mineral oil, and coupling agent. In other aspects, the present invention relates to a process for reclaiming or sealing an insulated electrical device and to an insulated electrical device which is formed by such process.

13 Claims, 1 Drawing Figure

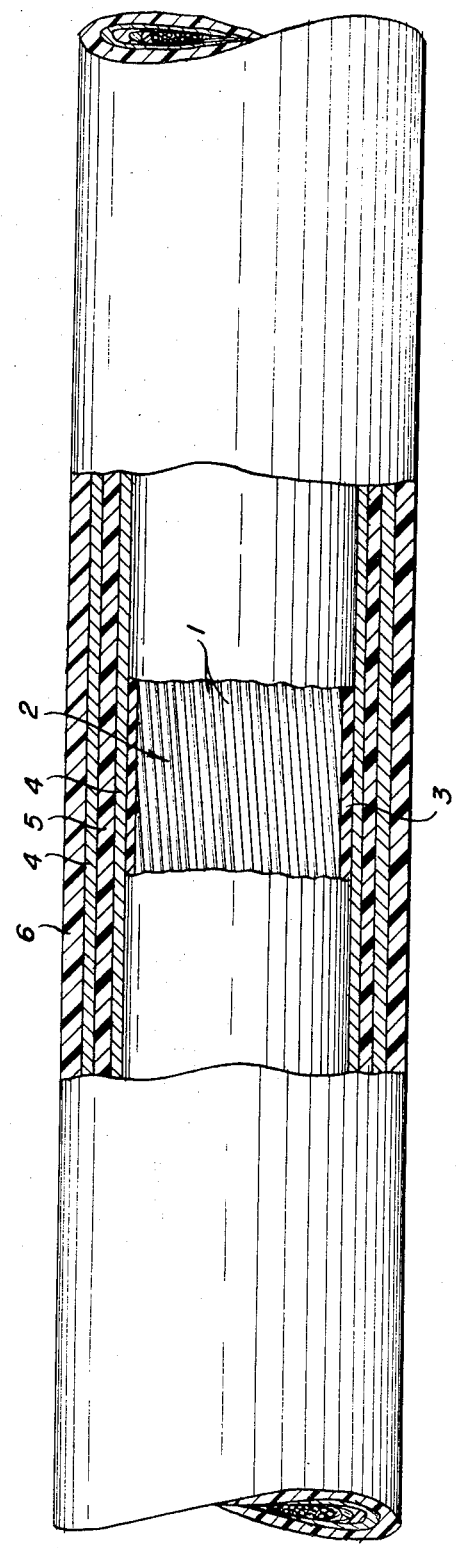

GREASE COMPATIBLE MINERAL OIL EXTENDED POLYURETHANE

This is a division of application Ser. No. 877,905, filed Feb. 15, 1978, now U.S. Pat. No. 4,168,258 issued Sept. 18, 1979.

BACKGROUND OF THE INVENTION

1. Field of the Invention

This invention relates to a grease compatible, cured, cross-linked, mineral oil extended polyurethane which is non-spewing, a process for reclaiming or sealing electrical devices by using the mineral oil extended polyurethane and the reclaimed or sealed electrical devices formed by such process.

2. Description of the Prior Art

It is an established practice in the art to use a variety of materials to extend polymers. The extension material or extender is generally selected depending upon the desired utility of the extended polymer, such utilities including the preparation of adhesives, molded articles, construction material, flooring and a multitude of other products.

It is also known in the art to use extended polyurethanes in the preparation of these products. One development in this field is an aromatic oil extended polyurethane. The aromatic oil extended polyurethane is particularly useful in the reclamation or rehabilitation of insulated electrical devices, such as underground multi-conductor telephone cables, which have been penetrated with fluid contaminants such as water. Compared to former techniques of reclaiming such insulated electrical devices, involving the injection of acetone or an inert gas, the use of aromatic oil extended polyurethane is a considerable improvement since it remains in the electrical device, after curing in situ, and forms a hydrophobic barrier against further water and aqueous penetration.

In an analogous utility, the aromatic oil extended polyurethane may be used as an encapsulant in sealing sections of cable wherein splicing or other repairs have been performed. In this embodiment, the extended polyurethane is maintained in the vicinity of the splice and serves, not to displace fluid contaminants, but to prevent their penetration when the cable is replaced in its original position.

In either the reclamation or encapsulant utilities, a principal disadvantage of using an aromatic oil extended polyurethane in an insulated cable is that the aromatic oil tends to chemically attack the plastic (e.g., polycarbonate) conductor connectors and/or polyolefin sheathing which is typically present in the cable. Additionally, the aromatic oil poses considerable danger to installing personnel due to its toxic, volatile nature.

In an effort to overcome the aforementioned problems attendant with the use of aromatic oils, the prior art attempted to extend polyurethanes using mineral oils. These prior art systems were not entirely successful since the mineral oil tended to exude or "spew" from the mineral oil extended polyurethane, particularly at higher extensions, e.g., above about 2:1, oil to polymer. It has also been found that extended periods of time and colder temperatures cause this "spewing" phenomenon, even at lower extensions.

The problems of the prior art were solved or substantially reduced by the mineral oil extended polyurethane described and claimed in applicant's U.S. Pat. No. 4,008,197. As more fully discussed therein, a non-spewing, cured, cross-linked, mineral oil extended polyurethane is obtained via the use of a defined polyurethane and a defined coupling agent.

The non-spewing, cured, cross-linked, mineral oil extended polyurethane of applicants' patent is particularly useful in the reclamation or encapsulation of underground cables in that it possesses excellent chemical and electrical properties. Specifically, this mineral oil extended polyurethane does not spew oil, even with oil extensions as high as about 10:1, to oil polymer, or over extended periods of time and at colder temperatures, and does not present a health hazard to installing personnel. The mineral oil extended polyurethane also does not chemically attack the plastic materials normally found in underground cables. Additionally, it possesses a high insulation resistance, a high volume resistivity, a low dissipation factor and a low dielectric constant which is required in an underground cable and is relatively low in specific gravity whereby it does not greatly increase the weight of the reclaimed or encapsulated cable.

It has now been discovered that when the non-spewing, cured, cross-linked, mineral oil extended polyurethane described in applicants' patent is brought into contact with grease, which is often present in newer insulated electrical devices such as underground cables, the mineral oil tends to migrate towards the grease. The migration causes the formation of an oily film at the grease interface and tends to decrease the effectiveness of the mineral oil extended polyurethane in the prevention of aqueous contamination of the electrical device.

OBJECTS AND SUMMARY OF THE INVENTION

It is therefore an object of the present invention to provide a mineral oil extended polyurethane which eliminates or substantially reduces the problems of the prior art and which is additionally compatible with grease.

It is a more specific object of the present invention to provide a grease compatible, cured, cross-linked, mineral oil extended polyurethane which is non-spewing and which incorporates a specifically defined polyurethane, mineral oil and coupling agent.

It is another object of the present invention to provide a process for employing the grease compatible, mineral oil extended polyurethane in the reclaiming or sealing of insulated electrical devices, and particularly the sealing of grease containing insulated electrical devices.

It is yet another object of the present invention to provide insulated electrical devices which have been reclaimed or sealed with the grease compatible, mineral oil extended polyurethane.

These and other objects, as well as the scope, nature and utilization of the invention will be apparent from the following summary and description of the preferred embodiments of the present invention.

In one aspect, the present invention relates to a grease compatible, cured, cross-linked, mineral oil extended polyurethane which is non-spewing. The mineral oil extended polyurethane comprises a defined polyurethane and/or a defined mineral oil and/or a defined coupling agent, wherein at least two of the defined materials are present in each instance.

In an aspect of the present invention wherein the polyurethane, the mineral oil and the coupling agent are all defined to obtain a reduction or elimination in mineral oil migration, the mineral oil extended polyurethane comprises:

(a) from about 8 to about 45 parts, by weight, of polyurethane, said polyurethane being prepared by reacting
   (i) a polyisocyanate prepolymer with
   (ii) a polyol selected from the group consisting of castor oil, polyether polyols, hydroxyl bearing homopolymers of dienes, hydroxyl bearing copolymers of dienes, and combinations thereof, (b) from about 20 to about 75 parts, by weight, of mineral oil, said mineral oil being characterized by having from about 1.0 to about 30% aromatic carbon atoms, based on the total number of carbon atoms present in the mineral oil, and (c) from about 10 to about 47 parts, by weight, of coupling agent, said coupling agent being characterized by
   (i) being miscible in all proportions with said mineral oil,
   (ii) having a total solubility parameter from about 8.2 to about 9.4,
   (iii) having a polar and hydrogen bonding solubility parameter from about 3.2 to about 4.3,
   (iv) having a non-polar solubility parameter from about 7.6 to about 8.4,
   (v) having a hydrogen bonding index number from about 6.0 to about 12.0, and
   (vi) being substantialy non-reactive with said polyisocyanate prepolymer and said polyol.

The prepolymer is formed by the reaction of a polyisocyanate compound with a polyol as defined above. In addition, at least about 0.25 equivalents of the polyisocyanate compound per 1.0 equivalents of the polyisocyanate compound used is a liquid long chain aliphatic polyisocyanate. The resulting mineral oil extended polyurethane is also characterized by the presence of a polydiene moiety in the polyurethane structure.

In another aspect, the present invention relates to a process for reclaiming or sealing an insulated electrical device by introducing into said device, a composition which cures into a grease compatible, cured, cross-linked, mineral oil extended polyurethane which is non-spewing and which is comprised of a defined polyurethane and/or a defined mineral oil and/or a defined coupling agent, wherein at least two of the defined materials are present in each instance.

In a further aspect, the present invention relates to an insulated electrical device containing the grease compatible, cured, cross-linked, mineral oil extended polyurethane which is non-spewing and which is comprised of a defined polyurethane and/or a defined mineral oil and/or a defined coupling agent, wherein at least two of the defined materials are present in each instance.

BRIEF DESCRIPTION OF THE DRAWINGS

FIG. 1 is a front elevational view, partly in section, of a length of a plastic insulated, multi-conductor telephone cable.

DESCRIPTION OF PREFERRED EMBODIMENTS

As stated hereinabove, one aspect of the present invention relates to a grease compatible, cured, cross-linked, mineral oil extended polyurethane which is non-spewing. Although the mineral oil extended polyurethane of the present invention may be used in a variety of different products, such as a waterproofing membrane in the construction field, a liquid casting system for potting or as a solid lubricant to replace grease in certain situations, in the interest of brevity and clarity, it will be described in the present specification in connection with the reclamation or sealing (encapsulation) of electrical devices, and particularly the sealing of insulated electrical devices containing grease.

In the present specification, the term "grease compatible" is used to indicate the substantial reduction or elimination of the tendency of the mineral oil to migrate toward the interface of the grease and the mineral oil extended polyurethane. The migration phenomenon is evidenced by a film or pool of separated mineral oil at the interface and in this regard, should be distinguished from exudation or spewing wherein mineral oil separates from the polyurethane throughout the mineral oil-polyurethane system and irrespective of the presence of grease.

The grease may be any of those which are typically employed in insulated, multi-conductor electrical devices, such as underground telephone cables. One type of grease which is commonly used in insulated electrical devices is a highly paraffinic mineral which contains from about 10 to about 15%, by weight, of a low molecular weight polyolefin such as polyethylene. To form the grease, the polyolefin is melted, combined with the mineral oil and allowed to solidify. Another type of grease is a petroleum jelly which generally has a specific gravity of from about 0.815 to about 0.880 (at 60° C.) and a melting point in the range of from about 38° to about 60° C. The grease is typically prepared by the fractional distillation of still residues, from the steam distillation of paraffin-base petroleum or from steam-reduced crude oils from which the light fractions have been removed. Since the grease is primarily composed of aliphatic constituents, it is believed that the migration phenomenon is caused by the preferential attraction of the grease for the mineral oil. It is to be understood, however, that applicants do not wish to be bound by this theory.

To eliminate or substantially reduce the above-described migration phenomenon, it has been found that it is necessary to particularly define the polyurethane and/or the mineral oil and/or the coupling agent used in the preparation of the grease compatible, cured, cross-linked, mineral oil extended polyurethane. While some reduction of migration is obtained by particularly defining one of the components, a significant reduction in migration is obtained by particularly defining two of the components and essentially all of the migration is eliminated by particularly defining the polyurethane, the mineral oil, and the coupling agent.

The grease compatible, cured, cross-linked, mineral oil extended polyurethane is generally comprised of from about 8 to about 45 parts of polyurethane, from about 20 to about 75 parts of mineral oil and from about 10 to about 47 parts of coupling agent, all parts expressed on a weight basis.

For lower mineral oil extended polyurethanes which are particularly useful for a variety of potting and encapsulating applications (e.g., splicing), the grease compatible, cured, cross-linked, mineral oil extended polyurethane is comprised of from about 25 to about 45 parts of polyurethane, from about 20 to about 40 parts of mineral oil and from about 25 to about 47 parts of coupling agent, all parts expressed on a weight basis.

Preferably, the grease compatible, cured, cross-linked mineral oil extended polyurethane is comprised of from about 30 to about 35 parts of polyurethane, from about 24 to about 38 parts of mineral oil and from about 30 to about 41 parts of coupling agent, all parts expressed on a weight basis.

The polyurethane which is used in the grease compatible, cured, cross-linked, mineral oil extended polyurethane of the present invention is generally prepared by reacting a polyisocyanate with a polyol. In a first embodiment, the polyisocyanate is a polyisocyanate compound which directly reacts with the polyol in the presence of the mineral oil and the coupling agent to form the mineral oil extended polyurethane. In a second and more preferred embodiment, the polyisocyanate is a polyisocyanate prepolymer which is in turn prepared by reacting an excess of a polyisocyanate compound with a polyol in a manner well known in the art. The polyisocyanate prepolymer is then reacted with the polyol in the presence of the mineral oil and the coupling agent to form the mineral oil extended polyurethane. The manner in which the polyisocyanate is reacted with the polyol will be discussed in detail below.

The polyisocyanate compound which is reacted with the polyol to form the polyurethane or which is used in the preparation of the polyisocyanate prepolymer may be an aliphatic polyisocyanate, a cycloaliphatic polyisocyanate or an aromatic polyisocyanate. Typical of such polyisocyanate compounds are 3-isocyanatomethyl 3,5,5-trimethylcyclohexyl isocyanate (IPDI), toluene diisocyanate (TDI), 4,4'-diphenylmethane diisocyanate (MDI), polymethylene polyphenylisocyanate, 1,5-naphthalene diisocyanate, phenylene diisocyanates, 4,4'-methylene bis (cyclohexyl isocyanate) ($H_{12}$MDI), hexamethylene diisocyanate (HMDI), biuret of hexamethylene diisocyanate, 2,2,4 trimethylhexamethylene diisocyanate and combinations thereof, as well as related aromatic, aliphatic and cycloaliphatic polyisocyanates which may be substituted with other organic or inorganic groups that do not adversely affect the course of the chain-extending and-/or cross-linking reaction.

While any of the polyisocyanates described above may be used in the preparation of the mineral oil extended polyurethane of the present invention, it has been found that to aid in the reduction of the migration of the mineral oil, at least about 0.25 equivalents per 1.0 equivalents of the polyisocyanate compound used, should be a liquid long chain aliphatic polyisocyanate having from about 12 to about 100, preferably from about 12 to about 50 carbon atoms in the carbon chain. The term "aliphatic", as used herein, includes those carbon chains which are substantially non-aromatic in nature. They may be saturated or unsaturated, unbranched, branched or cyclic in configuration and may contain substituents which do not adversely affect migration. Exemplary of the liquid long chain aliphatic polyisocyanates are dodecyl diisocyanate, tridecyl diisocyanate, etc. An especially preferred long chain polyisocyanate is a mixture of polyisocyanate isomers derived from a 36 carbon dimer aliphatic acid (hereafter DDI). This mixture of polyisocyanate isomers is available from General Mills Chemicals, Inc., under the trademark DDI DIISOCYANATE.

It is to be understood that the term "long chain aliphatic polyisocyanate" is also intended to encompass combinations of suitable polyisocyanates. In other words, to reduce migration, at least about 0.25 equivalents of polyisocyanate compound per 1.0 equivalents of the polyisocyanate compound used in the preparation of the prepolymer of which is directly reacted with a polyol to form the polyurethane, must be one or a combination of the liquid long chain aliphatic polyisocyanates.

From a reduction in migration standpoint, it is preferable to employ a polyisocyanate which is entirely composed of DDI. However, at present, it is economically preferable to mix the DDI with other polyisocyanates such as MDI and polymethylene polyphenylisocyanate (available from Upjohn Company under the trademark PAPI). Particularly acceptable results are obtained from a polyisocyanate mixture comprised of about 0.25 equivalents of DDI and about 0.75 equivalents of PAPI per 1.0 equivalents of polyisocyanate compound used in the preparation of the polyurethane.

The polyol which is reacted with the polyisocyanate compound and the polyol which is reacted with the prepolymer is selected from the group consisting of castor oil, polyether polyols, hydroxyl bearing homopolymers of dienes, hydroxyl bearing copolymers of dienes, and combinations thereof. Although not critical to the formation of the polyurethane, the polyols generally have a number average molecular weight between about 1,000 and about 6,000, preferably between about 1,000 and about 4,000.

The castor oil which may be used in the preparation of the mineral oil extended polyurethane is primarily composed of ricinolein which is a glyceride of ricinoleic acid. A typical castor oil comprises a mixture of about 70% pure glyceryl triricinoleate and about 30% glyceryl diricinoleate-monooleate or monolinoleate and is available from NL Industries, Inc., of Heightstown, N.J., as DB Oil.

Suitable polyether polyols include aliphatic alkylene glycol polymers having an alkylene unit composed of at least 3 carbon atoms. These aliphatic alkylene glycol polymers are exemplified by polyoxypropylene glycol and polytetramethylene ether glycol. Also, trifunctional compounds exemplified by the reaction product of trimethylol propane and propylene oxide may be employed.

The hydroxyl bearing homopolymers of dienes or hydroxyl bearing copolymers of dienes are prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl, generally lower alkyl, e.g., of about 1 to about 4 carbon atoms, substituted aryl, unsubstituted aryl, halogen, etc. Typical of such dienes are 1,3-butadiene, isoprene, chloroprene, 2-cyano-1,3-butadiene, 2,3-dimethyl-1,3,butadiene, etc. The preferred dienes are 1,3-butadiene and isoprene.

In the preparation of hydroxyl bearing copolymers of dienes, olefinically unsaturated monomers are generally employed in conjunction with the previously discussed dienes. The acceptable monomers include alpha-monoolefinic materials of from about 2 to about 12 carbon atoms, such as styrene, vinyl toluene, methyl methacrylate, acrylonitrile, etc. Styrene is especially preferably as the copolymerizable monomer.

A description of the dienes, copolymerizable monomers and the hydroxyl bearing homopolymers and copolymers prepared therefrom which may be employed in the present invention is set forth in U.S. Pat. No. 3,714,110, the content of which is incorporated by reference.

The preferred hydroxyl bearing homopolymer of butadiene is generally in liquid form and has the approximate structure:

CIS    TRANS

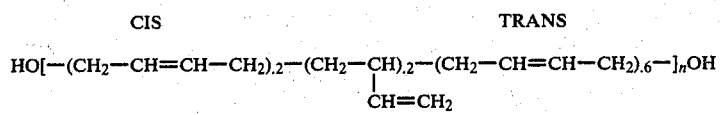

wherein n=57-65.

The preferred hydroxyl bearing copolymer of butadiene and styrene has the approximate structure:

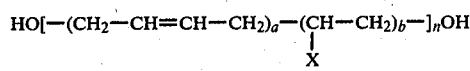

wherein X is C₆H₅
a=0.75
b=0.25
n=57-65

The hydroxyl bearing copolymer of butadiene and styrene generally has the following properties:
Butadiene, Wt.%=75
Styrene, Wt.%=25
Viscosity, poise at 30° C.=225
OH content meg./gm=0.65
Moisture, Wt.%=0.05
Iodine Number=335

The previously described hydroxyl bearing homopolymers of butadiene and hydroxyl bearing copolymers of butadiene are available from Arco Chemical Company under the trademark POLY-BD.

To enhance the compatibility of the mineral oil with the polyurethane and thus aid in the prevention of spewing and migration, it has been found that the polyurethane structure must contain a polydiene moiety which may be derived from hydroxyl bearing homopolymers of dienes, hydroxyl bearing copolymers of dienes or combinations thereof. The proportion of the polydiene moiety required in the polyurethane structure to reduce spewing and migration is dependent upon a number of variables such as the polyisocyanate compound, the type and amount of mineral oil and the type and amount of coupling agent. For a given system, the amount of polydiene moiety in the polyurethane structure is typically determined by routine experimentation well within the scope of expertise of one of ordinary skill in the art. In general, it is preferable that at least about 0.25 equivalents per 1.0 equivalents of the total polyol used in the preparation of the polyurethane be selected from the group consisting of hydroxyl bearing homopolymers of dienes, hydroxyl bearing copolymers of dienes, and combinations thereof.

In the embodiment of the present invention wherein a polyisocyanate prepolymer is used, either a portion or all of the polyol which is used in the preparation of the polyisocyanate prepolymer and/or either a portion or all of the polyol which is reacted with the prepolymer is a hydroxyl bearing homopolymer of a diene, a hydroxyl bearing copolymer of a diene or a combination thereof. In other words, the source of the polydiene moiety is not of importance as long as there is an adequate total amount of a hydroxyl bearing homopolymer of a diene, a hydroxyl bearing copolymer of a diene or combination thereof, used in the preparation of the polyurethane.

The functionality of the polyisocyanate and the polyol are each in the range of from 2.0 to about 3.0, preferably from about 2.2 to about 2.7. In order to provide suitable mechanical and electrical properties for the reclamation or sealing of insulated electrical devices within a reasonable period of time at ambient temperature, the mineral oil extended polyurethane should be cross-linked. Cross-linking may be obtained by using a polyisocyanate, a polyol, or both having a functionality greater than 2.0.

The hydroxyl functionality and molecular weight of several of the polyols which are suitable for use in the present invention are set forth in Table A.

TABLE A

| Polyol | OH Functionality | M.W. |
|---|---|---|
| Polybutadiene | 2.3-2.4 | 2912-3038 |
| Styrene-Butadiene Copolymer | 2.0 | 3280 |
| Castor Oil | 2.7 | 923 |
| Polyoxypropylene Glycol | 2.0 | 2040 |
| Trimethylol Propane/Propylene Oxide Reaction Product | 3.0 | 4145 |
| Polytetramethylene Ether Glycol | 2.0 | 2004 |

The ratio of the number of isocyanate groups to the number of hydroxyl groups in the polyurethane reactants is preferably between about 1.0 and about 1.3 to provide the desired polymer structure, even in the presence of minor amounts of water.

The mineral oils which may be used in the preparation of the mineral oil extended polyurethanes of the present invention include those aliphatic, cycloaliphatic and branched aliphatic saturated hydrocarbons which contain from about 15 to about 30 carbon atoms and which are distilled from petroleum. It is to be understood that the terms "mineral oil" and "aliphatic, cycloaliphatic and branched aliphatic saturated hydrocarbons", as used herein, are given their common industrial meaning so that the mineral oil may contain minor amounts of aromatic oils.

The mineral oils described above eliminate or substantially reduce the plastic connector and sheathing deterioration and health problems of the prior art wherein substantially pure aromatic oil was generally used. However, to reduce the tendency of the mineral oil to migrate to the grease interface, it has now been found that it is preferable to have the mineral oil include some aromatic oil. In general, the amount of aromatic carbon atoms in the mineral oil should be sufficient to reduce the migration phenomenon but should not cause the level of deterioration and health problems associated with the aromatic oil systems of the prior art. Thus, the mineral oil generally has from about 1.0 to about 30% aromatic carbon atoms, typically from about 5.0 to about 25% aromatic carbon atoms, and preferably from about 14 to about 25% aromatic carbon atoms, based on the total number of carbon atoms present in the mineral oil. The most preferred mineral oil contains about 20% aromatic carbon atoms.

In order to effectively compatibilize the mineral oil with the polyurethane, i.e., to prevent spewing, a coupling agent must be used in forming the mineral oil extended polyurethane of the present invention. The coupling agent must satisfy several criteria. First, it must be miscible in the mineral oils in all proportions. In other words, the coupler should be miscible in all proportions with mineral oils to form a true solution (i.e., one part coupler/99 parts mineral oil or 99 parts coupler/one part mineral oil).

Next, the coupling agent must have a total solubility parameter ($\delta_T$) in the range of from about 7.0 to about 9.5, preferably from about 7.2 to about 9.5. The ($\delta_T$) value of a substance is calculated according to the formula $$\delta_T = (\Delta E/V)^{\frac{1}{2}}$$

where E is the energy of vaporization to a gas at zero pressure (i.e., an infinite separation of the molecules); and V is the molar volume of component present. The dimensions of $\delta_T$ are (calories per cubic centimeter)$^{\frac{1}{2}}$. Since it is possible to ascertain E and V for most substances, the value of the total solubility parameter or $\delta_T$ may be calculated from the heat of vaporization $\Delta H$, since it can be shown that $$\Delta E 25° C. = \Delta H 25° C. - 592$$

Since the value of $\Delta H$ at 25° C. for most compounds may be found in the literature, this value may be used to calculate $\Delta E$ and then $\delta_T$. Further details on total solubility parameters and means for their calculation are found in an article entitled Solubility Parameter Values by H. Burrell and B. Immergut at P.IV-341, of Polymer Handbook edited by J. Brandrup and E. H. Immergut, 3rd Edition Interscience Publ. June 1967.

It has also been determined that the coupling agent of this invention has a hydrogen bonding index number in the range of from about 6.0 to about 12.0, preferably from about 8.2 to about 8.8. The hydrogen bonding index number ($\gamma$) of a compound is a measurement of its proton (hydrogen) attracting power. The hydrogen bonding index number ($\gamma$) (proton attracting power) of a compound is measured by comparing the relative strengths of the hydrogen bonds which the liquid compounds forms with a common proton or Deuterium donor.

In practice, this is done by dissolving deuterated methanol in the liquid to be tested. The proton attracting power of a liquid compound is determined by measurement of the movement produced on the OD vibrational band of $CH_3OD$. The OD vibrational band occurs at $4\mu$ in the liquid $CH_3OD$ and at $3.73\mu$ in the monomolecular $CH_3OD$ in dilute benzene solution. Benzene is considered to have an OD vibrational shift of 0. The formation of hydrogen bonds shifts the monomolecular band to lower frequencies or longer wave lengths. The stronger the proton attracting power of a liquid, the greater is the shift which it produces on the OD band. By Infrared Spectroscopy the perturbations of the OD band can be established.

The $\gamma$ value of a compound may be determined by measuring the shift in wave numbers of the OD vibrational band after dissolution in the liquid compound and dividing the resulting number by 10. (Wave number is the reciprocal of an angstrom unit). Those compounds having a $\gamma$ number of 0 to about 6.0 are generally acknowledged to be weak hydrogen bond acceptors. Compounds having index numbers in the range of from about 6.0 to about 12.0 are usually considered moderate hydrogen bond formers and those having index numbers above about 12.0 are considered to be strong hydrogen bonders. The coupling agents useful in this invention are those having a hydrogen bonding index number ($\gamma$) falling in the range between about 6.0 and about 12.0 as determined by the above-mentioned technique. The origin of the Hydrogen Bonding index system and additional details on the means for its computation are found in a series of articles by W. J. Gordy in J. Chem. Physics, Vol. VII, pp. 93–99, 1939, Vol. VIII, pp. 170–177, 1940 and Vol. IX, pp. 204–214, 1941.

In the screening of potential coupling agents, the determination of the total solubility parameter and the hydrogen bonding index number can be made using well-known analytical techniques as described above. The total solubility parameter and hydrogen bonding index number for many compounds are also available in the literature and may be determined by reference to the appropriate text.

The coupling agent is further selected so that it is non-reactive or substantially non-reactive with respect to the polyurethane-forming reactants or precursor (polyol, polyisocyanate, polyisocyanate prepolymer). That is, the coupling agent should not interfere with the formation of the polyurethane. Coupling agents which satisfy this criterion generally do not contain any labile hydrogen atoms in their structure.

In order to prevent evaporation, the coupling agent should have a boiling temperature above about 220° F. It is to be understood that this boiling temperature is solely a practical consideration and is not critical to the efficacy of the coupling agent in preventing spewing. Thus, in those environments wherein the temperature remains relatively low, a coupling agent having a boiling temperature significantly below 220° F. may be utilized.

Chemical compounds which satisfy the above criteria are generally liquid esters, ketones, and those compounds in which a polar group is attached to an alkyl structure, such as trialkyl phosphate. The coupling agent may contain one or more characteristic functional groups. That is, for example, the coupling agent may be a mono-, di-, or tri-ester as long as it meets the above criteria. The coupling agent may also be saturated or unsaturated and may be aromatic-aliphatic, cycloaliphatic or wholly aliphatic. A partial list of the coupling agents which may be used to prevent spewing is set forth in Table B:

TABLE B

| Coupling Agents | | | |
|---|---|---|---|
| | Solubility Parameters (in Cal/per CC)$^{\frac{1}{2}}$ | | |
| Chemical Name | $\delta T$ | $\delta PH$ | $\delta NP$ |
| 1. 2,2,4 Trimethyl-1,3 Pentanediol Diisobutyrate | 8.2 | 4.3 | 6.9 |
| 2. Di-2-ethylhexyl Sebacate | 8.6 | * | * |
| 3. Acetyl Tributyl Citrate | 9.2 | * | * |
| 4. Di-2-ethylhexyl Adipate | 8.5 | 3.8 | 7.6 |
| 5. Diisodecyl Phthalate | 8.8 | 4.0 | 7.8 |
| 6. Dioctyl Adipate | 8.5 | 3.8 | 7.6 |
| 7. Tributyl Phosphate | 8.6 | * | * |
| 8. Dibutyl Fumarate | 9.0 | 5.7 | 6.9 |
| 9. Acetyl Di-2-ethylhexyl Citrate | 8.6 | * | * |
| 10. Di-n-butyl Sebacate | 8.8 | * | * |
| 11. Dioctyl Phthalate | 9.0 | 4.4 | 7.9 |
| 12. Di-2-ethylhexyl Citrate | 8.6 | * | * |
| 13. Isobutyl Acetate | 8.4 | 4.6 | 7.1 |

TABLE B-continued

Coupling Agents

| Chemical Name | Solubility Parameters (in Cal/per CC)$^{\frac{1}{2}}$ | | |
|---|---|---|---|
| | $\delta T$ | $\delta PH$ | $\delta NP$ |
| 14. Methyl ethyl Ketone | 9.4 | 6.4 | 6.9 |
| 15. Methyl-n Butyl Ketone | 8.6 | 5.2 | 6.9 |
| 16. Diundecyl Phthalate | 8.8 | 3.8 | 7.9 |
| 17. 2-ethylhexyl Trimellitate | 9.0 | 4.3 | 7.9 |
| 18. Ditridecyl Adipate | 8.5 | 3.2 | 7.9 |

*Indicates values not calculated.

The coupling agents described above are effective in reducing or substantially eliminating spewing in the previously defined mineral oil extended polyurethanes. To reduce migration, however, it has been found that the coupling agent must be even more precisely defined. Specifically, a reduction in migration is obtained by employing a coupling agent having the above-enumerated miscibility with mineral oil, hydrogen bonding index number range, non-reactiveness and, preferably, boiling temperature, but having a total solubility parameter in the narrower range of from about 8.2 to about 9.4, preferably from about 8.7 to about 9.2, and most preferably from about 8.8 to about 9.0. The total solubility parameter ($\delta_T$) is composed of three components, namely the polar solubility parameter ($\delta_P$), the hydrogen bonding solubility parameter ($\delta_H$) and the non-polar solubility parameter ($\delta_{NP}$). The three components are related to the total solubility parameter according to the equation:

$$\delta_T = \sqrt{\delta_P^2 + \delta_H^2 + \delta_{NP}^2}$$

The separation of $\delta_T$ into the individual components is accomplished by initially calculating the aggregation number ($\alpha$) from the equation $$\log \alpha = 3.39066 \frac{T_b}{T_c} - 0.15848 - \log \frac{M}{\rho}$$

wherein $T_b$ is the boiling temperature in degrees absolute, $T_c$ is the critical temperature in degrees absolute, M is the molecular weight and $\rho$ is the density of the material.

From $\alpha$ and $\delta_T$ the hydrogen bonding solubility parameter may be calculated from the equation:

$$\delta_H = \delta_T \sqrt{\frac{\alpha - 1}{\alpha}}$$

The polar solubility parameter is determined from the equation:

$$\delta_P = \delta_T \sqrt{\frac{\Sigma F_P}{\alpha \Sigma F_T}}$$

wherein $\Sigma F_P$ is the sum of all the polar molar cohesion constants and $\Sigma F_T$ is the sum of all the molar cohesion constants.

From $\delta_T$, $\delta_P$ and $\delta_H$, the non-polar solubility parameter ($\delta_{NP}$) may be calculated from the equation:

$$\delta_{NP} = \sqrt{\delta_T^2 - (\delta_P^2 + \delta_H^2)}$$

Additional details of the various solubility parameters may be found in a book by K. L. Hoy entitled Tables of Solubility Parameters, published by Union Carbide Corp., July 21, 1969, and an article by K. L. Hoy in J. of Paint Tech., Vol. 42, No. 541, pp. 76–118, February, 1970.

To simplify the use of $\delta_P$, $\delta_H$ and $\delta_{NP}$ in determining coupling agents which are useful in reducing migration, $\delta_P$ and $_H$ have been combined to yield a polar and hydrogen bonding solubility parameter ($\delta_{PH}$) according to the equation:

$$\delta_{PH} = \sqrt{\delta_P^2 + \delta_H^2}$$

To aid in the reduction of migration, it has been found that the coupling agent must possess a total solubility parameter within the ranges discussed above, but must additionally possess a polar and hydrogen bonding solubility parameter ($\delta_{PH}$) in the range of from about 3.2 to about 4.3, preferably from about 3.8 to about 4.2, and a non-polar solubility parameter in the range of from about 7.6 to about 8.4, preferably from about 7.8 to about 8.2. The polar and hydrogen bonding parameter and the non-polar solubility parameter for some coupling agents are included in Table B.

Thus, of those coupling agents set forth in Table B, di-2-ethylhexyl adipate, dioctyl adipate, diundecyl phthalate, 2-ethylhexyl trimellitate and ditridecyl adipate may be used in reducing migration. Diundecyl phthalate, 2-ethylhexyl trimellitate and ditridecyl adipate are especially preferred as the coupling agent.

Selection of a particular coupling agent and determination of the correct amount to be employed is determined by simple experimentation and will vary from one mineral oil extended polyurethane to another. The selection is dependent upon chemical and physical differences in various polyisocyanate compounds and polyols as well as upon the desired amount of mineral oil extension in the cured, cross-linked mineral oil extended polyurethane. Thus, for example, a greater amount of a less preferred coupling agent will generally be required to obtain the same degree of grease and mineral oil compatibility when compared to a more preferred coupling agent. While the above-description has been made with reference to a single coupling agent, it is to be understood that combinations of coupling agents may also be used in reducing or eliminating spewing and/or migration and are therefore to be considered within the definition of "coupling agent."

The grease compatible, mineral oil extended polyurethane of the present invention may be used in the reclamation or sealing (encapsulation) of air core cables, but it is particularly useful in the reclamation or sealing of grease-containing electrical devices such as multi-pair telephone cables.

In a typical cable such as that illustrated in FIG. 1, a plurality of wire conductors 1 are disposed within the central core 2 of the cable. Each wire is surrounded by an insulating material, generally a polyolefin or polyester plastic. For a grease-containing cable, grease is generally found in the free spaces between the insulated wires. The plurality of insulated wires are tightly enclosed within a spiral wound sheath 3, usually a polyethylene terephthalate sheet material. Surrounding the sheath are two protective shields 4, made of a flexible metal sheeting such as aluminum. he shields are separated from one another by a continuous layer 5 of a suitable insulating material. Finally, an outer jacket 6 of a protective plastic such as polyethylene, covers the outermost aluminum layer and serves to protect the cable.

Aqueous contaminants generally find their way into the cable through pinholes and stress cracks that develop around fittings and cable connectors, ultimately lodging in the interior free spaces of the central core 2 of the cable. After a particular aqueous contaminant, for example water, has been present for some time in the core, the electrical properties of the cable can be deleteriously effected. At this point, the present invention may be employed to restore the cable to substantially its original operating condition.

The reclaiming operation of the present invention is generally carried out on location. As stated above, the polyurethane may be prepared by either reacting a polyisocyanate compound with a polyol or a polyisocyanate prepolymer with a polyol. In the first embodiment, the desired amounts of polyisocyanate compound, polyol, mineral oil and coupling agent are initially mixed together to form a single phase system. Catalyst and other known additives such as moisture scavengers (e.g., benzoul chloride), antioxidants, fungicides, pigments, etc., which are commonly used in the art and which do not adversely affect the polyurethane reaction may also be incorporated into the mixture. The amount and type of catalyst and other additives, as is known by those skilled in the art, is dependent, for example, on the precursor composition, the utility intended, the cure time desired, and ambient conditions present.

The composition comprised of the polyurethane precursor (i.e., the polyisocyanate compound and the polyol or the polyisocyanate prepolymer and the polyol), the mineral oil, the coupling agent, and, optionally, the catalyst and other additives, has an initial viscosity, at from about 15° C. to about 50° C., within the range of from about 10 to about 100 centipoise. It is important that the viscosity of the composition be kept relatively low in order to effect its introduction into the free spaces of a cable that is to be reclaimed. However, the amount of polyurethane precursor in the composition should also be kept low in order to prevent excessive weight gain in the electrical device to be reclaimed or sealed as well as for reasons of economy.

To introduce the composition into the cable, a small portion of the cable outer protective layers including jacket 6, aluminum protective shields 4 and sheath 3 are removed and a nipple (not shown) installed in the opening thus formed, using techniques that are well-known in the trade. This operation can be carried out from above, or below, and without removing the cable from its resting place. The composition having just been formed has a relatively low viscosity and is easily introduced into the core of the cable through a hose (not shown) connected to the nipple. Continuous pumping of the low viscosity composition is maintained in order to drive it along the length of the cable. After the composition has been injected into the cable, the delivery hose is withdrawn from the nipple and the hole in the nipple is sealed with a plug (not shown). The introduction operation will have driven the composition through the interior-free spaces of the cable and will displace the fluid penetrants and some of the grease (in a grease containing cable) in the interior free spaces (e.g., between the individual wires and the outer polyethylene terephthalate sheath).

Conveniently within from about 1.0 to about 120 hours after injection into an insulated electrical device, the composition cures to form a grease compatible, cured, cross-linked, mineral oil extended polyurethane which is non-spewing and which has a viscosity on the order of about 1000 centipoise. The mineral oil extended polyurethane is physically and chemically stable and does not lose mineral oil by exudation, spewing or migration. The hydrophobic nature of the cured, mineral oil extended polyurethane also serves to seal the cable against subsequent penetration of water or other fluid materials. Furthermore, the cured, mineral oil extended polyurethane has good insulating properties due to its relatively low dielectric constant and high volume resistivity.

When employing the grease compatible, mineral oil extended polyurethane as an encapsulant, a higher proportion of polyurethane is generally used, as stated above. The cable which is to be repaired or spliced is exposed and the insulating material 5, protective shields 4 and spiral wound sheath 3, is removed. After the repair or splice has been completed, a mold, typically composed of a plastic material, which conforms to the circumference of the cable is attached. The mold has a port through which is poured the composition comprising the polyurethane precursor, mineral oil, coupling agent and, optionally, catalyst and other conventional additives (as discussed above). Although the viscosity of the sealing composition is generally greater than that used in reclamation, the relatively low viscosity sealing composition is generally maintained in the vicinity of the repair or splice by placing clamps around the cable at both ends of the mold. In from about ten minutes to about four hours (depending on the catalyst, ambient conditions, etc.), the polyurethane precursor has desirably reacted to form a non-spewing, grease compatible, cured, cross-linked, mineral oil extended polyurethane which has a viscosity of about 100,000 centipoises. The clamps are then generally removed and the cable is reburied. The mold is usually left in place to provide additional structural support and protection for the cable. The non-spewing, grease compatible, cured, cross-linked, mineral oil extended polyurethane encapsulant provides a hydrophobic barrier against water or fluid penetration.

In the embodiment wherein a polyisocyanate prepolymer is employed, the contents of two separate containers are preferably mixed in approximately equal amounts to form the composition which is to be introduced into the insulated electrical device, such as an underground telephone cable. In this manner, instruction of installing personnel in the formulation and use of the composition is greatly facilitated.

In one container is the polyisocyanate prepolymer, which may be dissolved in mineral oil or, preferably, in a coupling agent. When reclamation is to be undertaken, between about 50 and about 200, and preferably about 100 grams of the polyisocyanate prepolymer is used per liter of solution. When encapsulation is to be performed, between about 200 and about 600, preferably about 400 grams of the polyisocyanate prepolymer is used per liter of solution.

In the second container is preferably a solution of between about 75 and about 200 and preferably about 150 grams per liter of polyol in mineral oil when reclamation is contemplated. When encapsulation is to be performed, between about 250 and about 500, preferably about 400 grams of polyol is used per liter of solution. In those instances where a catalyst is used, it is typically included in the contents of the second container.

The coupling agent may be added to the contents of the first container, the second container, or, preferably, both containers. The important consideration is that there be sufficient coupling agent in the overall composition to obtain a single phase system comprising the polyurethane precursor (i.e., the polyisocyanate prepolymer and the polyol), the mineral oil and the coupling agent. It is only by the use of this single phase system that a non-spewing, grease compatible, cured, cross-linked, mineral oil extended polyurethane may be obtained. The known additives may also be added to either or both of the containers.

After the contents of the two containers are mixed to form a low viscosity composition, the composition is then employed to reclaim or seal insulated electrical devices, such as underground cables, in the manner discussed above. A noted advantage of using the polyisocyanate prepolymer embodiment is that the composition generally requires less time to cure and form the non-spewing, grease compatible, cured, cross-linked, mineral oil extended polyurethane.

Whether the polyisocyanate compound embodiment or the polyisocyanate prepolymer embodiment is employed, the low viscosity composition is characterized by a low volatility (vapor pressure) and an inoffensive odor. Since the aromatic content of even the most preferred mineral oil is maintained relatively low, the toxicity of the composition is substantially less than the toxic products previously employed in reclamation techniques. When cured, the mineral oil extended polyurethanes do not spew even at higher extensions, colder temperatures or over extended periods of time. Furthermore, the tendency of the mineral oil to migrate to the grease interface is eliminated or substantially reduced. The mineral oil extended polyurethanes of the present invention also do not chemically attack the polycarbonate connectors and polyolefin, polyethylene terephthalate or other polymer materials which are typically used in cable manufacture.

The non-spewing, grease-compatible, cured, cross-linked, mineral oil extended polyurethane formed in either the reclaiming or sealing (encapsulating) of electrical devices, generally possesses a gel-like consistency. The term "gel-like" is used in the present specification to describe a relatively soft, non-brittle substance which is distinguishable from those extended polyurethanes having the consistency of hard plastic, wood or concrete. Although the actual consistency of the mineral oil extended polyurethane of the present invention may vary from a gellatin (evident in reclaimed devices) to a soft, sponge rubber (evident in encapsulated devices), the term "gel-like" is used to encompass such variations.

The electrical properties of the grease compatible, cured, cross-linked, mineral oil extended polyurethanes are excellent. Specifically, the mineral oil extended polyurethanes generally possess a relatively low dielectric constant of less than about 4.0 at 1 KhZ (as determined by ASTM D-150) and a volume resistivity of at least about $2.5 \times 10^{10}$ ohm-cm (as determined by ASTM D-257).

A further understanding of the present invention may be obtained with reference to the following examples. It is to be understood, however, that the invention is not limited to the embodiments described in the examples.

In Examples I-IV, the cured, cross-linked, mineral oil extended polyurethane is prepared from a polyisocyanate prepolymer and a polyol in a manner similar to that described in Example V. The cured, cross-linked, mineral oil extended polyurethane is then placed in contact with the grease. In Examples V and VI, the mineral oil extended polyurethane was allowed to cure while in contact with the grease.

EXAMPLE I

This example illustrates the effects on migration of aromatic, aliphatic and cycloaliphatic polyisocyanate compounds.

The mineral oil extended polyurethane is comprised of:

35% Polyurethane
30% Dioctyl Adipate
35% Mineral Oil (Drakeol 35*) All percentages being on a weight basis. The amount of polyurethane includes 0.17% antioxidant (a thio-bis-phenol available from Uniroyal Co., Inc. as AO 439), 0.015% catalyst (dibutyl tin dilaurate) and 0.03% moisture scavenger (benzoyl chloride).

*Drakeol 35 is a mineral oil comprised of 60% paraffinic, 40% naphthenic and 0% aromatic carbon atoms and is available from Pennrico, Inc., Butler, Pa.

The polyurethane is prepared from 0.61 equivalents of a hydroxyl bearing homopolymer of butadiene, 0.39 equivalents of castor oil and 1.08 equivalents of polyisocyanate compound. The mineral oil weight loss, based on the total weight of the mineral oil extended polyurethane, after seven days of contact with grease may be seen in Table C.

TABLE C

| Polyisocyanate | Weight Loss (%) |
|---|---|
| 4,4'-methylene bis (cyclohexyl isocyanate) | 1.5 |
| DDI | 0.35 |
| Biuret of hexamethylene diisocyanate | 2.9 |
| 2,2,4 trimethyl-hexamethylene diisocyanate | 1.8 |
| Polymethylene polyphenylisocyanate | 2.7 |

EXAMPLE II

This example illustrates the effects of blending polymethylene polyphenylisocyanate (PAPI) with DDI with respect to oil migration and reactivity (gel time). The mineral oil extended polyurethane is comprised of:

35% Polyurethane
30% Diundecyl Phthalate
35% Mineral Oil (Circosol 4130*)

All percentages being on a weight basis. The amount of polyurethane includes 0.17% antioxidant (AO 439), 0.02% fungicide (2-(4-thiazolyl)benzimidazole), 0.01% benzoyl chloride and an amount of catalyst indicated in Table D.

*Circosol 4130 is a mineral oil comprised of 41% paraffinic, 39% naphthenic and 20% aromatic carbon atoms and is available from Sun Oil Company.

The polyurethane is prepared from 0.61 equivalents of hydroxyl bearing homopolymer of butadiene, 0.39 equivalents of castor oil and 1.08 equivalents of a polyisocyanate compound. The effects of varying the proportion of DDI in the polyisocyanate compound with respect to the weight loss, based on the total weight of the mineral oil extended polyurethane, and amount of catalyst required is set forth in Table D.

TABLE D

| SAMPLE | PAPI (eg.) | DDI (eg.) | WEIGHT LOSS AFTER 1 MONTH CONTACT WITH GREASE (%) | % T-12 NEEDED FOR 30 MIN. GEL TIME* |
|---|---|---|---|---|
| A | 0.0 | 1.08 | 0.0 | 0.6 |
| B | 0.27 | 0.81 | 0.38 | 0.6 |
| C | 0.54 | 0.54 | 0.0 | 0.6 |
| D | 0.81 | 0.27 | 0.0 | 0.06 |
| E | 1.08 | 0.0 | 16.00 | 0.06 |

*T-12 is the catalyst dibutyl tin dilaurate. The gel time is defined as the time required to reach 100,000 centipoise at 77° F.

EXAMPLE III

This example illustrates the effects of the aromatic carbon content of an oil on oil migration. The oil extended polyurethane is comprised of:
35% Polyurethane
30% Dioctyl Adipate
35% Oil All percentages being on a weight basis. The amount of polyurethane includes 0.17% antioxidant (AO 439), 0.05% dibutyl tin dilaurate and 0.01% benzoyl chloride.

The polyurethane is prepared from 0.61 equivalents of hydroxyl bearing homopolymer of butadiene, 0.39 equivalents of castor oil and 1.08 equivalents of polymethylene polyphenylisocyanate. The mineral oil loss after seven days of contact with grease, using oils having varying percentages of paraffinic carbon atoms ($C_p$), naphthenic carbon atoms ($C_n$) and aromatic carbon atoms ($C_a$), based on the total number of carbon atoms present, is set forth in Table E.

TABLE E

| Carbon Atom Distribution (%) | Sample | | | | | | |
|---|---|---|---|---|---|---|---|
| | A | B | C | D | E | F | G |
| $C_a$ | 37.6 | 28.2 | 18.8 | 14.1 | 9.4 | 4.7 | 0 |
| $C_n$ | 32.8 | 34.6 | 36.4 | 37.3 | 38.2 | 39.1 | 40 |
| $C_p$ | 27.6 | 37.2 | 44.8 | 48.6 | 52.4 | 56.2 | 60 |
| Weight Loss (%) | 0.41 | 1.21 | 1.36 | 1.61 | 2.06 | 2.56 | 2.41 |

EXAMPLE IV

This example illustrates the effect of various coupling agents on oil migration.

The mineral oil extended polyurethane is comprised of:
35% Polyurethane
30% Coupling Agent
35% Mineral Oil (Circosol 4130)

All percentages being on a weight basis. The amount of polyurethane includes 0.17% antioxidant (AO 439), 0.02% fungicide (2-(4-thiazolyl benzimidazole)) and 0.03% dibutyl tin dilaurate.

The polyurethane is prepared from 0.61 equivalents of hydroxyl bearing homopolymer of butadiene, 0.39 equivalents of castor oil and 1.08 equivalents of polymethylene polyphenylisocyanate. Table F sets forth the oil weight loss, based on the total weight of the mineral oil extended polyurethane, after one week contact with grease.

TABLE F

| Coupling Agent | Weight Loss (%) |
|---|---|
| Dioctyl Adipate | 0.5 |
| Diundecyl Phthalate | 0.23 |
| 2-Ethylhexyl Trimellitate | 0.13 |
| n-Octyl, n-decyl Trimellitate | 0.35 |

The following Examples illustrate a preferred method of preparing the grease compatible, cured, crosslinked, mineral oil extended polyurethanes of the present invention.

EXAMPLE V (a) Prepolymer Formation

A reactor fitted with an agitator, thermometer, nitrogen inlet and reflux condenser is charged with 35.11 grams (0.1170 eq.) of DDI and 8.01 grams of castor oil (0.0234 eq.). The mixture is heated to about 70° C. for about 1½ hrs. under continuous agitation. To the mixture is added 56.85 grams of ditridecyl adipate and the resulting mixture is agitated for about ½ hr. 0.03 grams of benzoyl chloride is then added and the mixture agitated for about ¼ hr. The mixture is then allowed to cool to room temperature. The resulting prepolymer has a theoretical free isocyanate content of 3.91%, by weight.

(b) Polyol Solution Preparation

Into a reactor similar to that used in the preparation of the prepolymer, is charged 2.23 grams (0.0065 eq.) of castor oil and 0.03 grams of fungicide (2-(4-thiazolyl)-benzimidazole). The mixture is heated to about 77° C., under continuous agitation, for a period of about ¾ hr. or until the fungicide is dissolved. The mixture is cooled to about 50° C. and 29.6 grams (0.0236 eq.) of a hydroxyl bearing homopolymer of butadiene, 47.20 grams of 4130 oil, 0.23 grams of antioxidant (AO 439) and 20.21 grams of ditridecyl adipate is added. The mixture is stirred for about ¾ hr. and then cooled to about 38° C. 0.50 grams of dibutyl tin dilaurate is then added and the resulting mixture agitated for about ½ hr. The mixture is then allowed to cool to room temperature.

(c) Polymer Formation 26.0 grams of the prepolymer is mixed with 74.0 grams of the polyol and the resulting composition is allowed to cure while in contact with grease. After 1 week, the non-spewing, grease compatible, cured, cross-linked, mineral oil extended polyurethane has no mineral oil weight loss. This demonstrates the effect on oil migration of a mineral oil extended polyurethane prepared from DDI, a mineral oil containing 20% aromatic carbon atoms, based on the total number of carbon atoms present in the mineral oil and ditridecyl adipate.

EXAMPLE VI

Example V is repeated except that the polyisocyanate compound used in the preparation of the prepolymer is composed of 0.029 eq. of DDI and 0.088 eq. of polymethylene polyphenylisocyanate. After 1 week, the non-spewing, grease compatible, mineral oil extended polyurethane has no mineral oil weight loss.

Although the invention has been described with preferred embodiments, it is to be understood that variations and modifications may be resorted to as will be apparent to those skilled in this art. Such variations and modifications are to be considered within the scope of the following claims.

We claim:

1. A process for sealing an insulated electrical device comprising the steps of introducing into said device a composition comprising mineral oil, polyurethane precursor and coupling agent,
   (a) said polyurethane precursor comprising the reaction product of
      (i) a polyisocyanate compound or a polyisocyanate prepolymer prepared by the reaction of a polyisocyanate compound with a polyol selected from the group consisting of castor oil, polyether polyols, hydroxyl bearing homopolymers of dienes, hydroxyl bearing copolymers of dienes, and combinations thereof, wherein at least about 0.25 equivalents of the polyisocyanate compound per 1.0 equivalents of the polyisocyanate compound used is a liquid long chain aliphatic polyisocyanate, and
      (ii) a polyol selected from the group consisting of castor oil, polyether polyols, hydroxyl bearing homopolymers of dienes, hydroxyl bearing copolymers of dienes, and combinations thereof,
   (b) said mineral oil being characterized by having from about 1.0 to about 30% aromatic carbon atoms, based on the total number of carbon atoms present in the mineral oil, and
   (c) said coupling agent being characterized by
      (i) being miscible in all proportions with said mineral oil,
      (ii) having a total solubility parameter from about 7.0 to about 9.5,
      (iii) having a hydrogen bonding index number from about 6.0 to about 12.0, and
      (iv) being substantially non-reactive with said polyisocyanate prepolymer and said polyol,
reacting said polyol with said polyisocyanate in the presence of said mineral oil and said coupling agent to obtain a grease compatible, cured, cross-linked, mineral oil extended polyurethane which is non-spewing, and which is characterized by the presence of a polydiene moiety in the polyurethane structure, and which comprises from about 8 to about 45 parts of polyurethane, from about 20 to about 75 parts of mineral oil and from about 10 to about 47 parts of coupling agent, all parts expressed on a weight basis.

2. The process of claim 1 wherein the hydroxyl bearing homopolymers of dienes of claim 1, (a) (i) and (a) (ii) are hydroxyl bearing homopolymers of butadiene and wherein the hydroxyl bearing copolymers of dienes of claim 1, (a) (i) and (a) (ii) are hydroxyl bearing copolymers of butadiene.

3. The process of claim 1 wherein said liquid long chain aliphatic polyisocyanate contains from about 12 to about 50 carbon atoms in the carbon chain.

4. The process of claim 1 wherein the polyisocyanate compound used in the preparation of the polyurethane comprises about 0.25 equivalents of a mixture of polyisocyanate isomers derived from a 36 carbon dimer aliphatic acid and about 0.75 equivalents of polymethylene polyphenylisocyanate per 1.0 equivalents of polyisocyanate compound used.

5. The process of claim 1 wherein the grease compatible, cured, cross-linked, mineral oil extended polyurethane comprises from about 25 to about 45 parts of polyurethane, from about 20 to about 40 parts of mineral oil and from about 25 to about 47 parts of coupling agent, all parts expressed on a weight basis, wherein said coupling agent is further characterized by having a boiling temperature above about 220° F. and being selected from the group consisting of a ketone and an ester, and wherein said mineral oil is characterized by having from about 5.0 to about 25% aromatic carbon atoms, based on the total number of carbon atoms present in the mineral oil.

6. The process of claim 1 wherein the polyisocyanate compound used in the preparation of the polyurethane is a mixture of polyisocyanate isomers derived from a 36 carbon dimer aliphatic acid.

7. A process for sealing an insulated electrical device comprising the steps of introducing into said device a composition comprising mineral oil, polyurethane precursor and coupling agent,
   (a) said polyurethane precursor comprising the reaction product of
      (i) a polyisocyanate compound or a polyisocyanate prepolymer prepared by the reaction of a polyisocyanate compound with a polyol selected from the group consisting of castor oil, polyether polyols, hydroxyl bearing homopolymers of dienes, hydroxyl bearing copolymers of dienes, and combinations thereof, wherein at least 0.25 equivalents of the polyisocyanate compound per 1.0 equivalents of the polyisocyante compound used is a liquid long chain aliphatic polyisocyanate, and
      (ii) a polyol selected from the group consisting of castor oil, polyether polyols, hydroxyl bearing homopolymers of dienes, hydroxyl bearing copolymers of dienes, and combinations thereof and
   (b) said coupling agent being characterized by
      (i) being miscible in all proportions with said mineral oil,
      (ii) having a total solubility parameter from about 8.2 to about 9.4,
      (iii) having a polar and hydrogen bonding solubility parameter from about 3.2 to about 4.3,
      (iv) having a non-polar solubility parameter from about 7.6 to about 8.4,
      (v) having a hydrogen bonding index number from about 6.0 to about 12.0, and
      (vi) being substantially non-reactive with said polyisocyanate prepolymer and said polyol,
reacting said polyol with said polyisocyanate in the presence of said mineral oil and said coupling agent to obtain a grease compatible, cured, cross-linked, mineral oil extended polyurethane which is non-spewing, and which is characterized by the presence of a polydiene moiety in the polyurethane structure, and which comprises from about 8 to about 45 parts of polyurethane, from about 20 to about 75 parts of mineral oil, and from about 10 to about 47 parts of coupling agent, all parts expressed on a weight basis.

8. The process of claim 7 wherein said liquid long chain aliphatic polyisocyanate contains from about 12 to about 50 carbon atoms in the carbon chain.

9. The process of claim 7 wherein the grease compatible, cured cross-linked, mineral oil extended polyurethane comprises from about 25 to about 45 parts of polyurethane, from about 20 to about 40 parts of mineral oil and from about 25 to about 47 parts of coupling agent, all parts expressed on a weight basis, wherein said coupling agent is further characterized by having a boiling temperature above about 220° F. and being selected from the group consisting of a ketone and an ester, and wherein said mineral oil is characterized by having from about 5.0 to about 25% aromatic carbon atoms, based on the total number of carbon atoms present in the mineral oil.

10. The process of claim 7 wherein the hydroxyl bearing homopolymers of dienes of claim 7 (a) (i) and (a) (ii) are hydroxyl bearing homopolymers of butadiene and wherein the hydroxyl bearing copolymers of dienes of claim 7, (a) (i) and (a) (ii) are hydroxyl bearing copolymers of butadiene.

11. The process of claim 7 wherein the polyisocyanate compound used in the preparation of the polyurethane comprises about 0.25 equivalents of a mixture of polyisocyanate isomers derived from a 36 carbon dimer aliphatic acid and about 0.75 equivalents of polymethylene polyphenylisocyanate per 1.0 equivalents of polyisocyanate compound used.

12. The process of claim 7 wherein the polyisocyanate compound used in the preparation of the polyurethane is a mixture of polyisocyanate isomers derived from a 36 carbon dimer aliphatic acid.

13. The process of claim 1 wherein the coupling agent is characterized by
  (i) being miscible in all proportions with said mineral oil,
  (ii) having a total solubility parameter from about 8.2 to about 9.4,
  (iii) having a polar and hydrogen bonding solubility parameter from about 3.2 to about 4.3,
  (iv) having a non-polar solubility parameter from about 7.6 to about 8.4,
  (v) having a hydrogen bonding index number from about 6.0 to about 12.0, and
  (vi) being substantially non-reactive with said polyisocyanate prepolymer and said polyol.

* * * * *